(12) United States Patent
Lee et al.

(10) Patent No.: US 7,617,571 B2
(45) Date of Patent: Nov. 17, 2009

(54) PIN-LESS ASSIST GRIP HANDLE ASSEMBLY

(75) Inventors: Joel R. Lee, Homewood, IL (US); Peter A. Sullivan, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 147 days.

(21) Appl. No.: 11/869,842

(22) Filed: Oct. 10, 2007

(65) Prior Publication Data

US 2008/0098563 A1 May 1, 2008

Related U.S. Application Data

(60) Provisional application No. 60/855,322, filed on Oct. 30, 2006.

(51) Int. Cl.
*A45C 3/00* (2006.01)
(52) U.S. Cl. ............................. 16/412; 16/438; 296/214
(58) Field of Classification Search .................. 16/445, 16/412, 444, 438, 273, 277, 337, DIG. 24, 16/DIG. 50, DIG. 85, 307, 308, 285, 295; 296/214, 210, 91.1; 411/41, 45–48
See application file for complete search history.

(56) References Cited

U.S. PATENT DOCUMENTS

| | | | |
|---|---|---|---|
| 5,975,606 A * | 11/1999 | Forbes et al. ................ | 296/1.02 |
| 6,397,435 B1 * | 6/2002 | Gosselet ....................... | 16/438 |
| 6,616,222 B1 * | 9/2003 | Ponceau ....................... | 296/214 |
| 6,668,424 B1 * | 12/2003 | Allen et al. ................... | 16/444 |
| 6,836,932 B2 * | 1/2005 | Yamamoto et al. .......... | 16/110.1 |
| 7,103,939 B2 * | 9/2006 | Belchine et al. .............. | 16/412 |
| 2002/0020042 A1 * | 2/2002 | Kurachi et al. ............... | 16/438 |
| 2002/0020250 A1 * | 2/2002 | Sakuma et al. ............. | 74/551.9 |
| 2003/0074767 A1 * | 4/2003 | Chang .......................... | 16/438 |
| 2005/0060842 A1 * | 3/2005 | Ibaraki et al. ................. | 16/295 |

* cited by examiner

*Primary Examiner*—Victor Batson
*Assistant Examiner*—Rowland D Do
(74) *Attorney, Agent, or Firm*—Mark W. Croll; Paul F. Donovan

(57) ABSTRACT

A hinge assembly for mounting a spring in a passenger assist handle assembly for a vehicle includes spaced supports and a canister containing a spring connected to the supports on opposite ends of the canister. Protrusions and receiving surfaces are provided on each end of the canister and on the supports for securing a position of the canister relative to the supports and resisting rotational forces exerted against the canister.

20 Claims, 4 Drawing Sheets

PIN-LESS ASSIST GRIP HANDLE ASSEMBLY

CROSS-REFERENCE TO RELATED APPLICATIONS

The present regular U.S. patent application claims the benefits of U.S. Provisional Application Ser. No. 60/855,322 filed on Oct. 30, 2006.

FIELD OF THE INVENTION

The present invention relates to passenger assist handle assemblies in motor vehicles and the like; and, more specifically, the invention pertains to so-called pin-less assist grip handle assemblies and the structures for mounting the biasing spring assemblies thereof.

BACKGROUND OF THE INVENTION

Passenger assist handles are installed in automobiles to provide a stabilizing grip location for vehicle occupants while entering and exiting the vehicle or while moving about in the vehicle. Assist handles are known in the forms of loops or bars that can be grasped by the individuals. In a further known design for passenger assist handles, the handle comprises a substantially rigid bar having legs at the ends thereof, with the legs being pivotally connected to mounting blocks attached to the frame, door posts or other interior structures of the vehicle. The handle can be free swinging from the mounting blocks or can be provided with a spring urging the handle toward a closed, stowed position. It is known to use dampers to control the movement of the handle that results from the force applied by the spring.

In prior known assist grip handle designs, a hinge was coupled to the assist grip through the use of a pivot pin, to provide the axis for the pivoting action of the assist grip handle. Such prior designs were successful in most situations and for most purposes, but did include certain disadvantages in some situations. For example, prior assist grip handle assemblies having pivot pins required numerous individual components, and as a result have been cumbersome and complex to assemble on account of the need for installing the pivot pin. Increased complexity for assembly and installation increases the cost for providing such passenger conveniences in automobiles.

U.S. Pat. No. 7,103,939 entitled "PIN-LESS DAMPER ASSEMBLY FOR AN ASSIST GRIP HANDLE" issued on Sep. 12, 2006, and discloses a damper assembly provided in a handle assembly that does not require the use of a pivot pin. The damper assembly can be snap fit to the assist grip handle assembly to provide control of the rotational movement of the assist grip handle. Accordingly, tools are not required for assembling the assist grip assembly, and the assembly can be performed efficiently.

Known pin-less assist grip handle assemblies have been satisfactory for the intended use thereof. However, it is sometimes desirable to use very soft, compliant materials for various portions of the assist grip assembly. In some situations, the softer, less rigid materials in a pin-less assembly can bend or deflect to the point where disassembly or partial disassembly occurs, rendering the assembly inoperative. Further, the forces applied by the biasing spring even when the handle is in the stowed or non-use condition can cause softer materials to deflect slightly, thereby causing misalignment and unsatisfactory performance of the handle. Also, during the installation and assembly process, the spring assembly may be pressed past its intended location and out of the proper operating position. Still further, when the assist grip is extended in any manner during normal operation, the force of the spring can cause twisting of the softer materials, again causing misalignment and functional inadequacies.

Accordingly, it is desirable to retain the advantages of pin-less assemblies, even for use with softer, more compliant materials and to enhance the locating and strength features of the assembly.

SUMMARY OF THE INVENTION

The present invention provides locating features rigidly positioning the spring assembly within a pin-less assist grip handle assembly while maintaining a snap-together overall structure with improved assembly positioning.

In one aspect of one form thereof, the present invention provides a passenger assist handle assembly for a vehicle with a handle, first and second legs at opposite ends of the handle and first and second hinge assemblies pivotally connected to the first and second legs. One of the hinge assemblies includes first and second mounting supports and a spring assembly mounted between the mounting supports. The spring assembly includes a canister having first and second ends and a spring disposed in the canister. One of the ends is connected to one of the supports by a first protrusion received in a hole, and the other of the ends is connected to the other of the supports by aligned protrusions received in a channel and additional protrusions spaced from and on opposite sides of the channel.

In another aspect of another form thereof, the present invention provides a hinge assembly for a passenger assist handle assembly of an automobile. The hinge assembly has a mounting base, first and second spaced supports connected to the mounting base, and a spring assembly mounted between and connected to the first and second supports. The spring assembly includes a canister having first and second ends and a spring disposed in the canister. An end segment of the spring projects outwardly from the canister. The first end of the canister defines a hole, and the first support defines a first protrusion received in the hole. The second end defines second and third protrusions, and the second support defines a channel receiving the second and third protrusions. The second end further defines first and second shoulders, and the second support defines fourth and fifth protrusions on opposite sides of the channel. The shoulders are engaged against the fourth and fifth protrusions.

In a still further aspect of a still further form thereof, the present invention provides a passenger assist handle assembly with a handle having first and second legs on opposite ends thereof. Each of the first and second legs defines a cavity therein, and first and second hinge assemblies are pivotally connected to the first and second legs in the first and second cavities. Each of the first and second hinge assemblies includes a mounting base having deflectable mounting tabs for securing the handle assembly in an automobile. One of the hinge assemblies has first and second supports in spaced relation to each other and a spring assembly mounted between the supports. The spring assembly includes a canister having first and second ends connected to the first and second supports and a spring disposed in the canister. The spring has an end segment projecting outwardly from the canister and engaging a surface of the handle. The first end includes a hole and a ramp leading to the hole, and the first support defines a first protrusion received in the hole. The second end and the second support each define additional protrusions establishing anti-rotational engagement against surfaces of each other.

An advantage of one form of the present invention is providing a pin-less hinge assembly for a passenger assist handle of an automobile that is securely and accurately located during use and while at rest.

Another advantage of another form of the present invention is providing a passenger assist handle assembly with a hinge structure that is efficient to assemble and install without the need for special tools and/or complex assembly procedures.

Still another advantage of still another form of the present invention is providing a passenger assist handle assembly having few separate parts, thereby facilitating assembly.

Yet another advantage of yet another form of the present invention is providing a spring assembly and mounting structure for a vehicle passenger assist handle that can be used with softer materials in the handle and maintains accurate positioning of the assembly even under the uneven forces thereon from the biasing spring in both stowed and use conditions.

Other features and advantages of the invention will become apparent to those skilled in the art upon review of the following detailed description, claims and drawings in which like numerals are used to designate like features.

Figure 1:
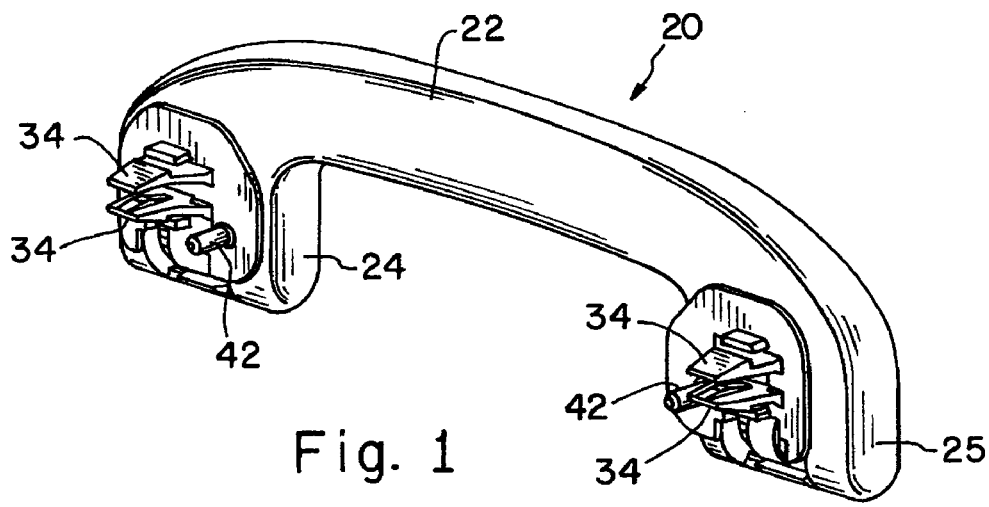
FIG. 1 is a perspective view of a pin-less assist grip handle assembly in accordance with the present invention, illustrating the handle in a raised or stowed position.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 2:
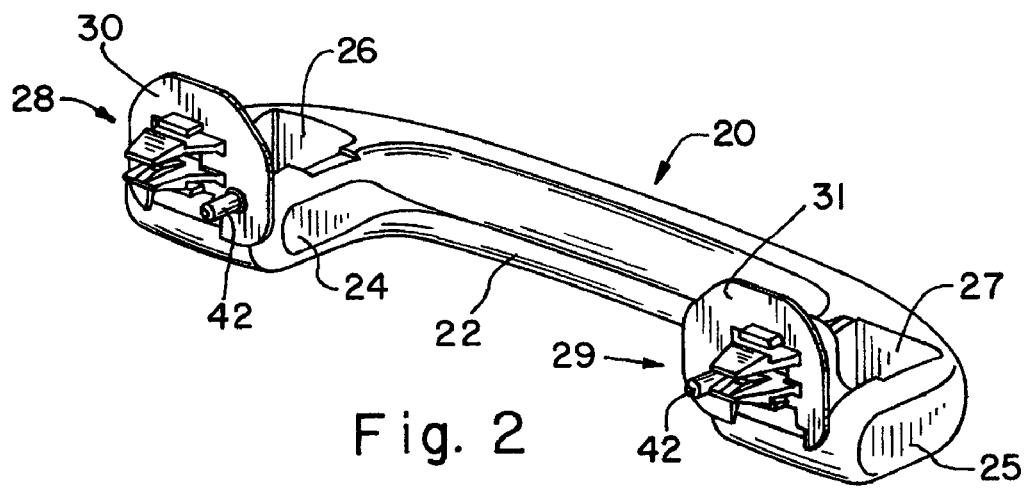
FIG. 2 is a perspective view of the handle assembly shown in FIG. 1, but illustrating the handle in the down or use position.
Figure 3:
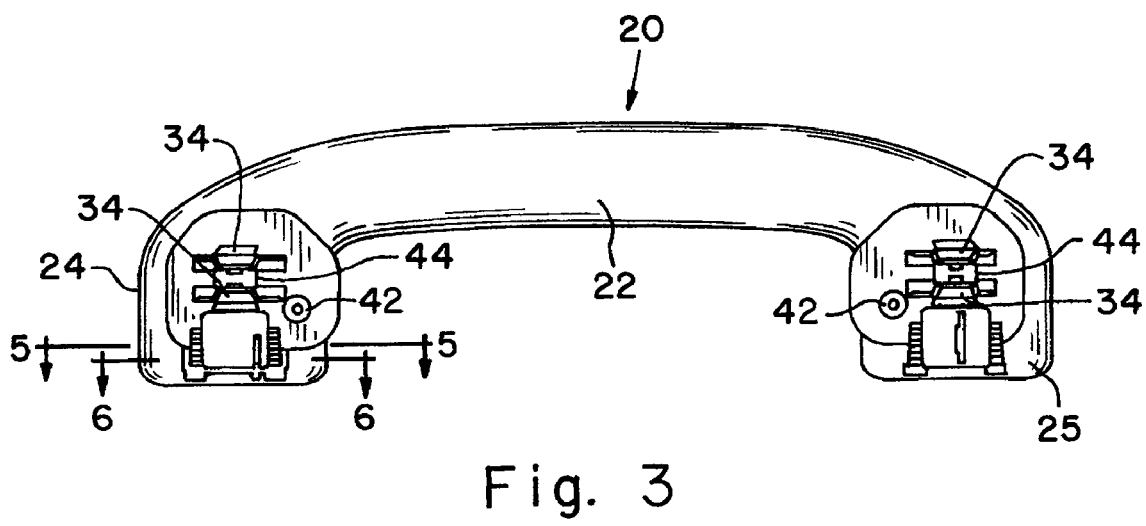
FIG. 3 is an elevational view of the handle assembly shown in FIGS. 1 and 2.
Figure 4:
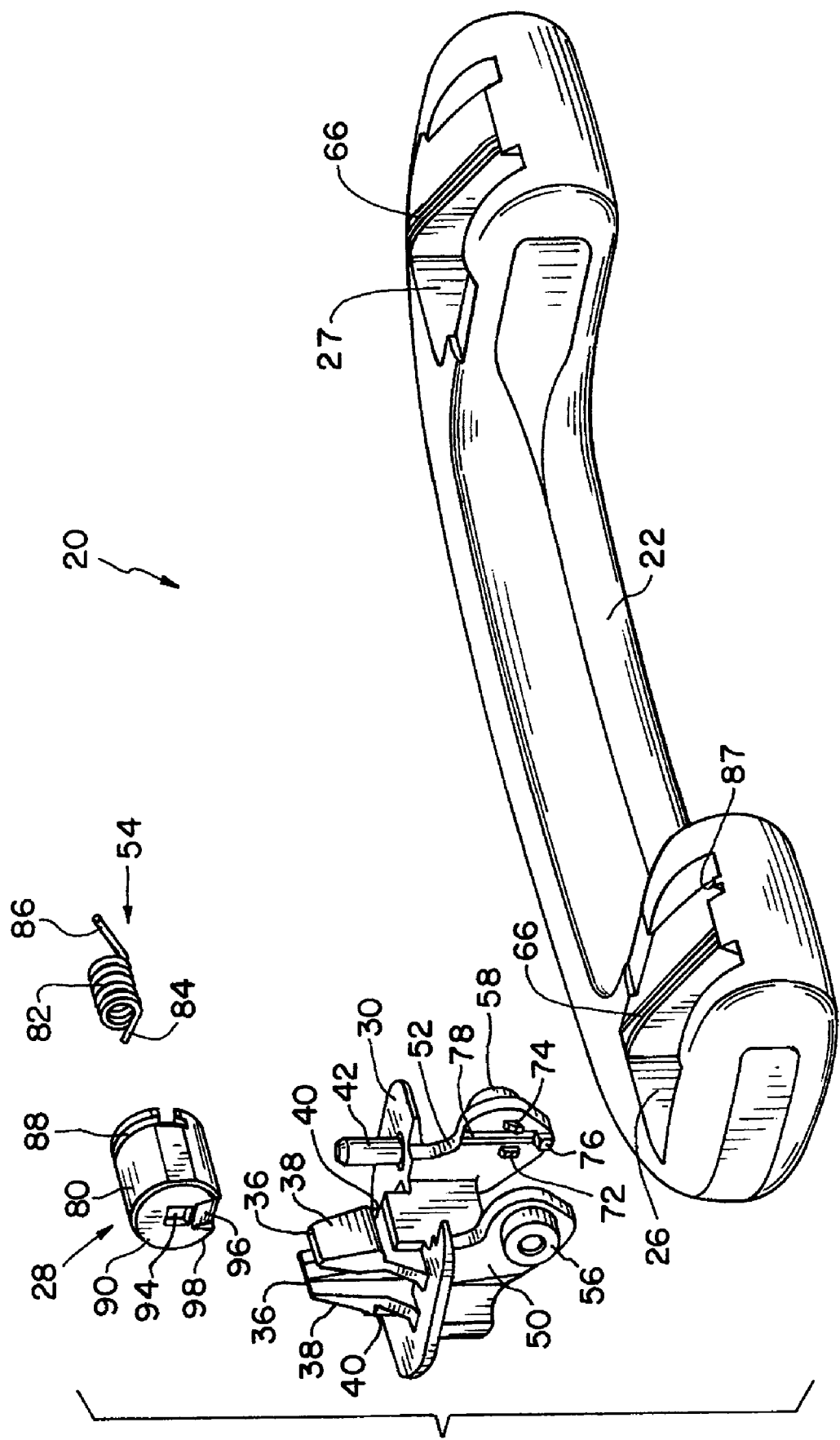
FIG. 4 is an exploded, perspective view of the handle assembly shown in FIGS. 1-3.
Figure 5:
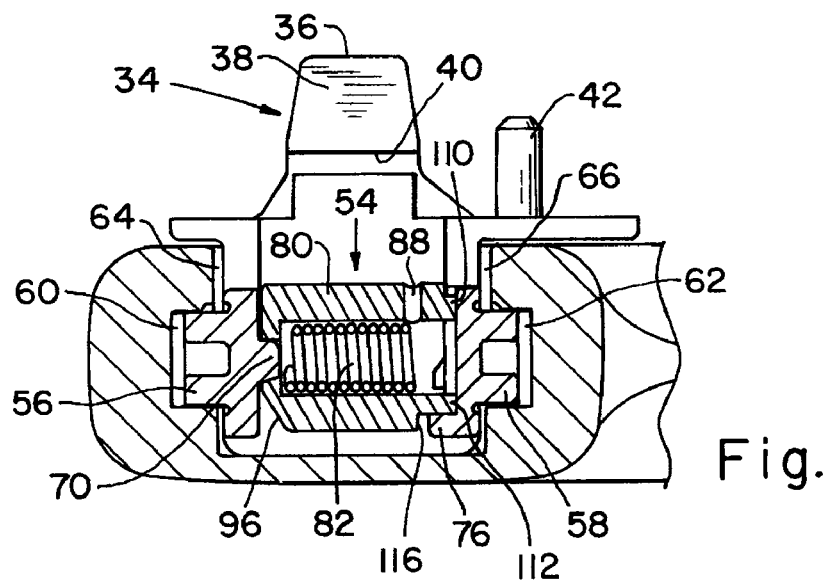
FIG. 5 is a cross-sectional view of the handle assembly shown in FIG. 3, the cross-section having been taken along line 5-5 of FIG. 3.
Figure 6:
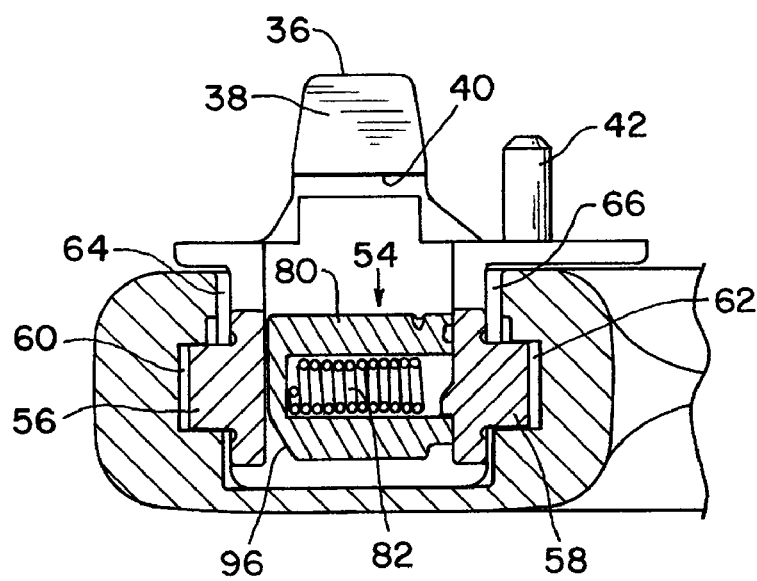
FIG. 6 is a cross-sectional view of the handle assembly shown in FIG. 3, the view being taken along line 6-6 of FIG. 3.
Figure 7:
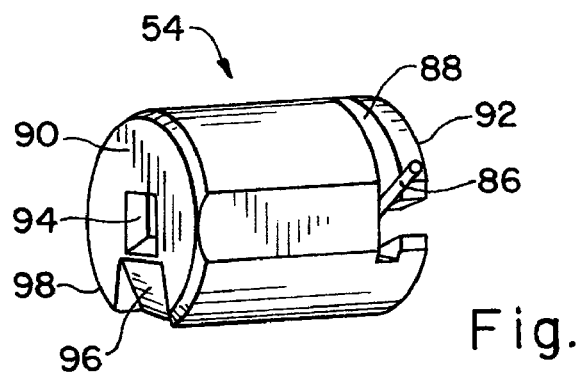
FIG. 7 is a perspective view of the spring canister for the handle assembly of the present invention.
Figure 8:
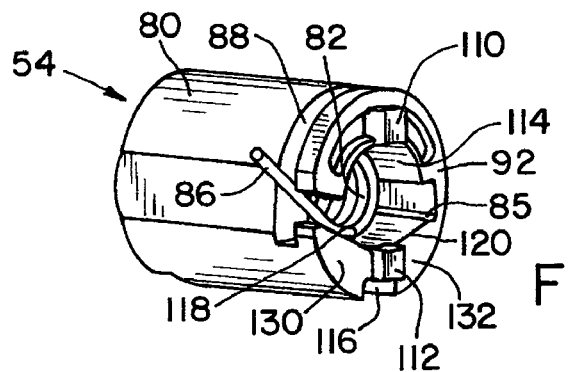
FIG. 8 is a perspective view of the spring canister assembly shown in FIG. 7, shown from a different angle.
Figure 9:
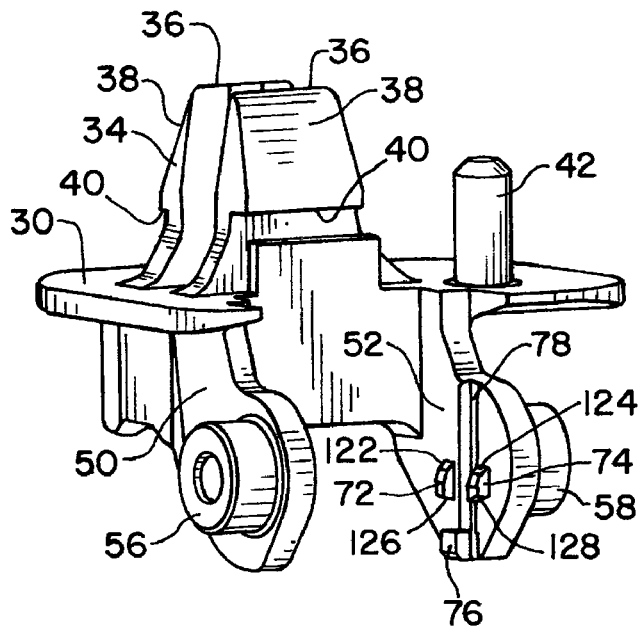
FIG. 9 is a perspective view of the mounting hinge for the handle assembly.
Figure 10:
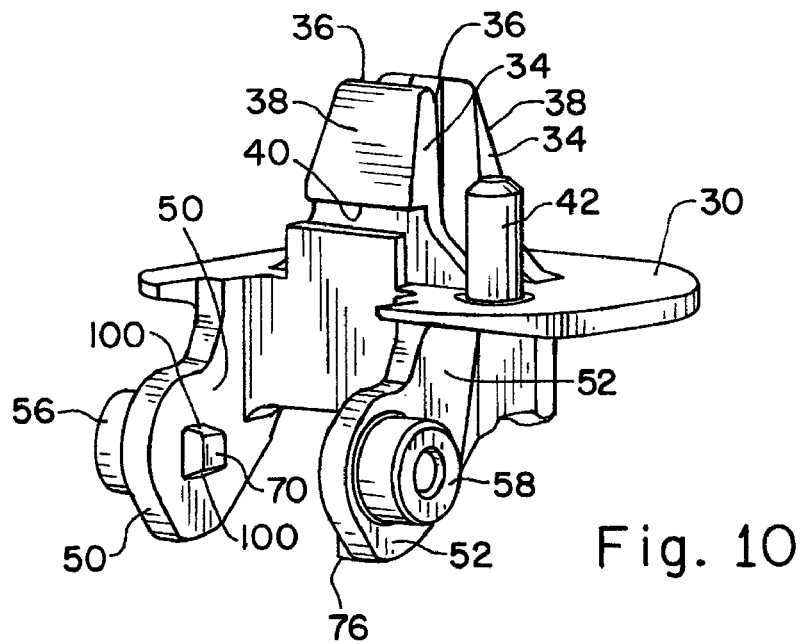
FIG. 10 is a perspective view of the mounting hinge illustrated in FIG. 9 but shown from a different angle.

Referring now more specifically to the drawings, and to FIGS. 1, 2 and 3 in particular, an assist grip handle assembly 20 of the present invention includes a handle 22 of suitable shape and contour for grasping by vehicle occupants while entering a vehicle, exiting a vehicle or while moving about within the vehicle.

Handle 22 defines first and second legs 24, 25 at opposite ends thereof, each having a cavity 26, 27 respectively, formed therein. Hinge assemblies 28 and 29 are connected to handle 22, one such hinge assembly 28 or 29 being operatively connected in each cavity 26, 27 respectively. Accordingly, hinge assembly 28 is associated with leg 24 via cavity 26, and hinge assembly 29 is associated with leg 25 via cavity 27. Hinge assemblies 28, 29 include mounting bases 30, 31 respectively, configured for attachment to handle 22 within cavities 26, 27, respectively, and for attachment to the vehicle headliner, usually over the vehicle windows, as is known to those skilled in the art.

Hinge assembly 29 can be associated with a pin-less damper assembly (not shown) such as, for example, the damper assembly disclosed in U.S. Pat. No. 7,103,939 referred to previously herein. The damper assembly provides smooth, controlled movement of handle 22 between the stowed and opened positions shown in FIGS. 1 and 2, respectively. Various parts of hinge assembly 29, and specifically parts shown for mounting base 31 of hinge assembly 29, are similar to corresponding parts of hinge assembly 28 and mounting base 30 to be described in greater detail hereinafter. The corresponding similar parts of hinge assembly 29 are designated with the same reference numerals as those to be described with respect to hinge assembly 28.

Mounting base 30 of hinge assembly 28 includes a pair of outwardly extending, spaced apart, flexible mounting tabs 34 that are used to secure the hinge assembly to a mating opening in the vehicle interior. Tabs 34 permit hinge assembly 28 to be snap fit to the mating opening in the vehicle by deflecting inwardly as the tabs pass through the opening. Each of the tabs 34 defines a tapered end 36 having an angular face 38 to facilitate the insertion of tabs 34 into the mating opening. Each of the tabs also defines a ledge or undercut 40 on the outside thereof near tapered end 36 at the base of angular face 38, such that undercut 40 defines a mounting recess to assist in holding and securing tabs 34 within a mating opening (not shown). As will be understood by those skilled in the art, an edge of structure defining an opening in which mounting tabs 34 will be installed can seat against undercut 40 to hinder inward and outward movement relative to the opening after installation is completed. A locating pin 42 is provided on mounting base 30 to facilitate positioning during installation by aligning with a receiving hole in the vehicle. A hole or aperture 44 is provided in mounting base 30 between the base ends of mounting tabs 34 for inserting a lock pin (not shown) to secure the mounting hinge in the aperture of the vehicle in which it is received. By inserting a pin through aperture 44 in the space between mounting tabs 34, the lock pin limits inward deflection of the tabs 34, thereby preventing withdrawal of the tabs from the receiving aperture (not shown) unless and until the lock pin is withdrawn.

Mounting base 30 of hinge assembly 28 further includes opposed mounting supports 50, 52 used to pivotally connected handle 22 to mounting base 30. Mounting supports 50, 52 are spaced apart to define a passageway through which is inserted an operatively mounted biasing spring assembly 54 of the present invention. Each mounting support 50, 52 includes an outwardly extending boss 56, 58 that in use are snap fit into opposing holes 60, 62 located within and on opposite sides of cavity 26 in handle leg 24. Lead in tracks 64, 66 are provided to allow for easier insertion of bosses 56, 58 in the opposing holes 60, 62.

Mounting support 50 defines a protrusion 70 on the inside surface thereof, and mounting support 52 defines three protrusions 72, 74 and 76 on the inside surface thereof. A channel 78 extends from an edge of support 52 and terminates at protrusion 76. Protrusions 72 and 74 are disposed on opposite sides of channel 78. Protrusions 70, 72, 74, 76 and channel 78 are operatively associated with spring assembly 54 for mounting and receiving spring assembly 54 between supports 50 and 52 in a snap-together assembly.

Spring assembly 54 includes a canister 80 and a helical spring 82. Helical spring 82 is contained within canister 80, with a first end segment 84 of helical spring 82 seated against canister 80, such as against a ledge or shelf 85 in canister 80, to limit relative rotation between canister 80 and spring 82. A second end segment 86 of spring 82 projects outwardly from canister 80 through a slot 88 and engages a ledge or other contact surface 87 in handle 22 to thereby impart spring force against a position of handle 22 relative to the fixed position of canister 80 between supports 50, 52. Slot 88 accommodates movement of end segment 86 as handle 22 is rotated between stowed and in-use positions. When handle 22 is released, spring 82 biases handle 22 toward the stowed position.

With spring 82 anchored at opposite ends via end segments 84, 86 against the canister 80 and handle 22, respectively, a twisting force can be exerted against canister 80. If structures of handle assembly 20, such as handle 22, legs 24, 25 or supports 50, 52 are primarily of soft materials, the twisting force can cause dislocation of the assembled parts. The present invention overcomes this disadvantage.

Canister 80 is a substantially cylindrical body having first and second ends 90, 92. First end 90 defines a hole 94 and a ramp 96 extending from the peripheral edge 98 of canister end 90 to hole 94. Protrusion 70 is received in hole 94, and ramp 96 facilitates assembly by guiding protrusion 70 into hole 94 in a snap-together assembly. In a preferred arrangement of the present invention, protrusion 70 and hole 94 are noncircular in shape, to inhibit relative rotation there between in the assembled structure. In the exemplary embodiment shown, protrusion 70 and hole 94 are generally four sided and square, although other shapes also can be used. Further, protrusion 70 can be provided with one or more angular surface 100 to cooperate with ramp 96 in the snap-together installation of spring assembly 54 between supports 50, 52

It should be understood also that while an exemplary embodiment has been shown and described in which support 50 includes protrusion 70, and canister 80 includes hole 94 and ramp 96, other arrangements can be used as well. For example, a hole such as hole 94 together with a ramp such as ramp 96 can be provided in support 50, and canister 80 can be provided with a protrusion such as protrusion 70 to be received in the hole.

Second end 92 defines aligned protrusions 110 and 112 on opposite extremes of an opening 114 through which spring 82 is assembled into canister 80. Protrusions 110 and 112 are received in channel 78 during assembly, and slide there along until protrusion 112 encounters and abuts against protrusion 76. A notch 116 is provided between protrusion 112 and the outer edge of canister 80, and protrusion 76 is received in notch 116 and against protrusion 112. The physical engagement of protrusion 112 against protrusion 76 inhibits over insertion when spring assembly 54 is installed between supports 50, 52. Again, if protrusions 76, 110 and 112 are provided with opposed flat sides received against and within notch 116 and channel 78, the protrusions in the notch and channel inhibit relative rotation between spring assembly 54 and supports 50, 52.

Shoulders 118, 120 are provided on opposite sides of protrusion 112. Protrusions 72, 74 on support 52 are received against shoulders 118, 120 to further stabilize the position of canister 80 relative to supports 50, 52. To facilitate assembly, protrusions 72, 74 have angular lead in surfaces 122, 124 that are first encountered by canister 80 during assembly, and blunt or flat engagement surfaces 126, 128 that seat against shoulders 118, 120 in the completed assembly. Outer surfaces 130, 132 on canister 80 leading to shoulders 118, 120 respectively can be angular to facilitate snap together assembly, as will be described hereinafter. Protrusions 72, 74 and shoulders 118, 120 are of sufficient width to remain engaged one against the other even as twisting or deformation occurs within handle assembly 20 during use or as a result of changing environmental or use conditions.

It should be understood that changes in the angle of the end segment from the spring projecting through canister 80 and engaged against handle 22 can further alter the twisting forces applied against the structures to minimize potential deformation and miss location. Shoulders and/or ledges can be provided on canister 80 and on mounting base 30 to further stabilize the relative positions of each with respect to one another.

During assembly, hinge assembly 28 is secured in cavity 26 by snapping bosses 56, 58 into holes 60, 62. Helical spring 82 is assembled into canister 80 by insertion through opening 114. First end segment 84 is engaged against ledge 85 in canister 80. Spring assembly 54 including canister 80 with spring 82 assembled therein is installed between supports 50, 52 in a snap-together assembly. Ramp 96 is aligned with protrusion 70 and protrusion 112 is slid into channel 78. As canister 80 is forced towards its final position, protrusion 110 also enters channel 78. Ramp 96 slides along protrusion 70 as protrusions 110, 112 slide along channel 78. As protrusions 70 enters hole 94, protrusion 112 engages protrusion 76 as protrusions 76 settles into notch 116. Protrusions 72, 74 are passed by surfaces 130, 132 and snap over to engage against shoulders 118, 120. Second end segment 86 of spring 82 comes to engage against ledge or contact surface 87.

The spring retaining structure of the present invention facilitates precise and rigid location of the spring within a pin-less assist grip assembly, even when soft, easily deformed materials are used for the handle and other structures. The present invention secures the spring in the intended location whether under actuated loading during use or under static forces at rest in a stowed position, including conditionally applied stresses under changing conditions.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A passenger assist handle assembly for a vehicle, said handle assembly comprising:
   a handle;
   first and second legs at opposite ends of said handle;
   first and second hinge assemblies pivotally connected to said first and second legs;

one of said hinge assemblies including first and second mounting supports and a spring assembly mounted between said mounting supports;

said spring assembly including a canister having first and second ends and a spring disposed in said canister;

one of said ends of said canister connected to one of said supports by a first protrusion received in a hole; and the other of said ends of said canister connected to the other of said supports by aligned protrusions received in a channel and additional protrusions spaced from and on opposite sides of said channel.

2. The handle assembly of claim 1, said first protrusion disposed on said one of said supports and said hole disposed in said one of said ends of said canister.

3. The handle assembly of claim 1, said protrusions having flat surfaces on opposite sides.

4. The handle assembly of claim 1, said other of said supports defining said channel, and said aligned protrusions being received in said channel.

5. The handle assembly of claim 4, said other of said ends of said canister defining a notch adjacent one of said aligned protrusions, and said other of said supports having a further protrusion at an end of said channel received in said notch.

6. The handle assembly of claim 5, said other of said ends of said canister defining shoulders engaged against said additional protrusions.

7. The handle assembly of claim 6, said first protrusion disposed on said one of said supports and said hole disposed in said spring assembly.

8. A hinge assembly for a passenger assist handle assembly of an automobile, said hinge assembly comprising:

a mounting base;

first and second supports connected to said mounting base, said supports being spaced from one another;

a spring assembly mounted between and connected to said first and second supports, said spring assembly including a canister having first and second ends and a spring disposed in said canister, with an end segment of said spring projecting outwardly from said canister;

said first end of said canister defining a hole and said first support defining a first protrusion received in said hole;

said second end defining second and third protrusions, and said second support defining a channel receiving said second and third protrusions;

said second end further defining first and second shoulders, and said second support defining fourth and fifth protrusions on opposite sides of said channel, said shoulders engaged against said fourth and fifth protrusions.

9. The hinge assembly of claim 8, said second support defining an additional protrusion at an end of said channel and said second end defining a notch adjacent one of said second and third protrusions for receiving said additional protrusion.

10. The hinge assembly of claim 8, said second and third protrusions having flat surfaces on opposite sides thereof engaged against said channel.

11. The hinge assembly of claim 8, said fourth and fifth protrusions having flat surfaces engaged against said shoulders.

12. The hinge assembly of claim 8, said canister defining a slot, and said spring end segment extending outwardly from said canister through said slot.

13. The hinge assembly of claim 8, said fourth and fifth protrusions having angular lead-in surfaces.

14. The hinge assembly of claim 8, said first end defining a ramp from an edge of said canister to said hole, said ramp defining a path during assembly directing said first protrusion to said hole.

15. The hinge assembly of claim 14, said hole having flat edges on opposite sides thereof, and said first protrusion having flat surfaces on opposite sides thereof engaged against said flat edges of said hole.

16. A passenger assist handle assembly comprising:

a handle having first and second legs on opposite ends thereof, each of said first and second legs defining a cavity therein;

first and second hinge assemblies pivotally connected to said first and second legs in said first and second cavities;

each of said first and second hinge assemblies including a mounting base having deflectable mounting tabs for securing said handle assembly in an automobile;

one of said hinge assemblies having first and second supports in spaced relation to each other and a spring assembly mounted between said supports;

said spring assembly including a canister having first and second ends connected to said first and second supports and a spring disposed in said canister, said spring having an end segment projecting outwardly from said canister and engaging a surface of said handle;

said first end including a hole and a ramp leading to said hole, and said first support defining a first protrusion received in said hole; and said second end and said second support each defining additional protrusions establishing anti-rotational engagement against surfaces of each other.

17. The hinge assembly of claim 16, said spring having another end segment engaging a ledge in said canister.

18. The handle assembly of claim 16, said second end of said canister including second and third protrusions and said second support defining a channel with said second and third protrusions disposed in said channel.

19. The handle assembly of claim 18, said second support defining fourth and fifth protrusions on opposite sides of said channel, and said second end of said canister defining shoulders engaged against said fourth and fifth protrusions.

20. The hinge assembly of claim 19, said second support defining an additional protrusion at a closed end of said channel, and said second end of said canister defining a notch adjacent one of said second and third protrusions, said additional protrusion disposed in said notch.

* * * * *